United States Patent [19]
Kordon

[11] Patent Number: 4,836,121
[45] Date of Patent: Jun. 6, 1989

[54] SURFACE EFFECT SHIP

[76] Inventor: Moon J. Kordon, 2942 W. 33rd St., Apt. 11-C, Brooklyn, N.Y. 11224

[21] Appl. No.: 195,618

[22] Filed: May 19, 1988

[51] Int. Cl.⁴ ............................................... B63B 1/34
[52] U.S. Cl. ..................................... 114/67 A; 180/120
[58] Field of Search ............ 114/67 A; 180/116, 117, 180/120, 124, 128, 129

[56] References Cited

U.S. PATENT DOCUMENTS

| | | | |
|---|---|---|---|
| 3,302,602 | 2/1967 | Korganoff | 180/120 |
| 3,382,678 | 5/1968 | Reh | 114/67 A |
| 3,467,213 | 9/1969 | Walker | 180/120 |
| 3,667,567 | 6/1972 | Rutkowski | 180/117 |
| 4,290,500 | 9/1981 | Hopkins et al. | 180/117 |

*Primary Examiner*—Joseph F. Peters, Jr.
*Assistant Examiner*—Jesûs D. Sotelo

[57] ABSTRACT

A surface effect ship and a system of cushion pressurization by forcing into the cushion chamber a homogeneous mixture of air and gas. The surface effect ship is provided with a hull, having propulsion device, associated with rudders, and a skirt to confine the pressurized cushion chamber beneath the ship. In order to decrease the empty weight and thus to increase the performance of the surface effect ship, the traditional heavy and complicated mechanical lift system for cushion pressurization is substituted by a combination of a source of gas with a gasdynamical converter, as a lift system, to feed the cushion chamber of the surface effect ship by a homogeneous air and gas mixture. A turbojet engine is used as a source of highly energetic gases, and the gasdynamical converter is used for augmentation and homogenization of the mixture of air and gas. When the turbojet engine is running, its exhaust gas enters entirely into the gasdynamical converter, simultaneously inhaling into the gasdynamical converter a multiplied mass of atmospheric air. After an intensive energy exchange in the mixture process between the gases and atmospheric air, the augmented mass of homogeneous mixture of air and gas is directed downwardly into the cushion chamber, through a duct, providing the cushion chamber with required flow volume and pressure to support the surface effect ship above a surface in operation.

4 Claims, 1 Drawing Sheet

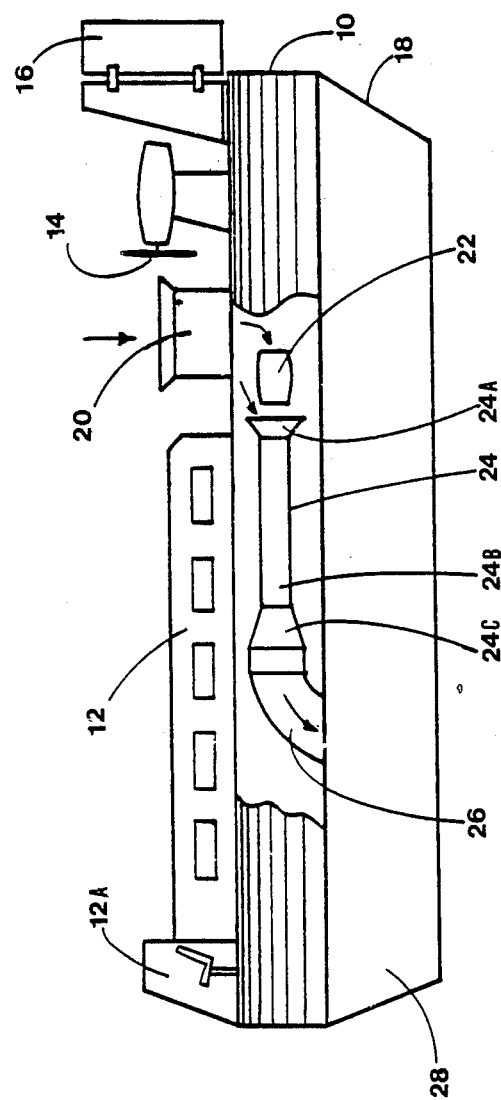

SURFACE EFFECT SHIP

CROSS-REFERENCE TO RELATED APPLICATIONS

This application is related to my earlier application Ser. No. 06/895,264, filed Aug. 11, 1986, now abandoned.

BACKGROUND OF THE INVENTION

The subject invention relates to a surface effect ship and a system of cushion pressurization by forcing a homogeneous mixture of air and gas into a cushion chamber of a surface effect ship to support the ship above a surface.

At the very outset of surface effect ship development, numerous experiments were made to find and establish the methods of cushion pressurization and propulsion. As a result, it has been determined that a fan and a propeller, driven by engines, are the most effective technical means to provide the surface effect ship with required thrust, flow volume and cushion pressure.

See: (1) L. H. Hayward: The History of Air Cushion Vehicles, London, 1963; (2) I. T Everest: Factors Affecting Hovercraft Performance at Low Speed over Water—"Hovering Craft and Hydrofoil", 1964; (3) J. B. Chaplin: The Air Cushion Vehicle Evaluation and Potential—"Naval Engineers Journal", 1966; (4) L. L. Keiler:.Hovercraft Research at Royal Aircraft Establishment, Bedford—"Hovering Craft and Hydrofoil", 1967; (5) G. J. Thomson: The Design and Development of Hovercraft Machinery—"Hovering Craft and Hydrofoil", 1967; (6) M. Wilson: SR.N4—The Biggest Yet—"Air Cushion Vehicles", 1967; (7) Jones R. Stanton: The Future Development of Hovercraft—"Aircraft Engineering", 1968.

The U.S. Pat. No. 4,290,500 to Hopkins et al discloses a small surface effect ship with separate machinery, in which one engine drives a fan to feed the air cushion, and the other engine drives a propeller for thrust. The payload of this small ship is low being eroded by relatively high empty weight.

The U.S. Pat. No. 3,467,213 to Walker discloses a surface effect ship with a combined flow system, in which a turboprop engine drives a propeller in a duct, and the flow of air/gas heterogeneous mixture is discharged partly into a cushion zone of the vehicle, and partly is used to provide with a propulsion jet for movement. It has been determined that, to overcome aerodynamical loss in the propulsive duct, the machinery of this type of vehicle must develop extra flow pressure than is necessary to support the vehicle above a surface. Therefore, the low efficiency is the only reason why a combined flow system was not, in principle, taken into consideration for surface effect ships.

The U.S. Pat. No. 3,302,602 to Korganoff discloses a multipurpose vehicle with a combined flow system, capable of traveling on, below or above the water and above land. Two of many substantial disadvantages of this vehicle will be noted: (1) The engineering value and efficiency of the skirt, usually used to confine the presurized cushion's chamber, has been simply disregarded, therefore without a skirt, the vehicle must have an enormous source of energy to provide beneath of the ship with required flow volume and pressure for traveling above water and above land. (2) The empty weight of the vehicle's design will be high and, accordingly, the useful load will be low, because the weight of the hull is relatively high, being designed to resist water pressure during traveling under water.

The large and medium operative surface effect ships are equipped with a heavy machinery to transfer the power of the engines to the lift fans and the propellers, to provide with required flow volume, cushion pressure and thrust. The machinery of these ships is heavy, mechanically complicated and consists of many multilink driving shafts, clutches and reduction gears. Typical of such surface effect ships are LCAC, built by Textron Marine Systems, U.S.A., and SR.N6, SR.N4 built by British Hovercraft Corp., Ltd., United Kingdon. In the SR.N4, for instance, driving shafts from the engines to lift fans are 18.3 meters long. Moreover, in accordance with the statistical data, normally there is a substantial loss of energy in the mechanical lift systems of large and medium modern surface effect ships. The loss of energy is between 30% and 35%. Furthermore, the roots of high performance of any vehicle are in its empty weight. The empty weight is the one and only most important index of vehicle's efficiency. The lower is the empty weight, the higher is the vehicle's performance. In other words, the lower is the empty weight, the higher can be the useful load: the payload (a constant load) and the fuel (a variable load).

As is known, the weight problem is best solved in the design of aircraft. On the average, the empty weight of an aircraft is 50% of the gross weight—see JANE'S ALL THE WORLD'S AIRCRAFT, 1985-1986. Typically, the empty weight of a surface effect ship is 60% of the gross weight—see AVIATION WEEK AND SPACE TECHNOLOGY, Mar. 10, 1986. Summary: 1. Two properties characterize desirable high performance of the surface effect ships: their empty weight and the energy losses in the machinery; 2. The principal disadvantages of the large and medium surface effect ships, found in the prior art, are in their relatively high empty weight, and substantial loss of energy in their mechanical lift systems; 3. There has long been a need in the surface effect ships field for a low-cost and high performance ships.

SUMMARY OF THE INVENTION

The object of the subject invention is to provide a new and improved surface effect ship, which is capable of efficient operation. It is a further object of the subject invention to provide a surface effect ship with a reduced empty weight, by eliminating the fan and the heavy, complicated mechanical system of energy transmission from the engine to the lift fan. It is another object of the subject invention to provide a surface effect ship that can carry increased useful load.

In accordance with these and many other objects, the subject invention provides a surface effect ship with a hull, having a cabin, a pilot's compartment, propulsion means, for example, air screws, associated with rudders, and a skirt to confine pressurized cushion chamber.

In a preferred embodiment, under the deck of the ship are mounted aligned a combination of a source of highly energetic gas with a gasdynamical converter, as a lift system, with assignment to substitute the heavy, complicated and low efficient traditional mechanical lift system. As a source of highly energetic gases a turbojet engine is used, and the gasdynamical converter is for augmentation and homogenization of the air and gas mixture. When the turbojet engine is running, its exhaust gas enters entirely into the gasdynamical converter, simultaneously inhaling a multiplied mass of atmospheric air into the gasdynamical converter. Three main parts characterize the gasdynamical converter: a subsonic feed nozzle, a mixture chamber and a subsonic diffuser. The subsonic feed nozzle provides an efficient entry of exhaust gas and air flow into the mixture chamber with a minimum of aerodynamical losses. Since parameters of the exhaust gas of the turbojet engine are relatively high in comparison with atmospheric air, the mixture chamber provides an intensive energy exchange between gases and the air flow, forming a homogeneous mixture of air and gas with relatively low temperature, low flow velocity and the pressure on the level to keep the surface effect ship hovering. The diffuser, at the end of the mixture chamber, provides thermodynamical transformation of the kinetic flow energy by decreasing the velocity to increase the flow pressure before entering of the homogeneous air and gas mixture into the cushion chamber of the surface effect ship. From the gasdynamical converter the homogeneous mixture of air and gas is directed, through an associated duct, into the cushion chamber of the surface effect ship.

DESCRIPTION OF THE PREFERRED EMBODIMENT

Objects and advantages of the present invention will be apparent from the following detailed description, taken in conjunction with the accompanying drawing, which schematically illustrates a surface effect ship, embodying the invention. In the drawing there is illustrated a structure comprising a hull 10, having: a cabin 12, a pilot's compartment 12A, propulsion means, for example, air screws 14, associated with rudders 16, and a skirt 18 to confine pressurized cushion chamber 28, beneath the ship.

According to the present invention, under the deck of the ship are mounted aligned a combination of a source of highly energetic gases 22, such as a turbojet engine, with a gasdynamical converter 24. Gasdynamical converter 24 consists of three main parts: a subsonic narrowing feed nozzle 24A, a mixture chamber 24B and a subsonic diffuser 24C. The exhaust gas from the source of gas 22 enters entirely into the mixture chamber 24B through narrowing subsonic feed nozzle 24A, simultaneously inhaling into the mixture chamber 24B multiplied mass of atmospheric air from an air intake 20 of the hull 10. An intensive energy exchange in the mixture chamber 24B occurs between highly energetic gases and augmented mass of inhaled air, forming a homogeneous flow mixture, having relatively low temperature, low flow velocity and the appropriate flow pressure. Then the homogeneous air and gas mixture is directed, through the subsonic diffuser 24C and associated duct 26 into the cushion chamber 28 of the surface effect ship, to support the ship above a surface.

The surface effect ship can be equipped with more than one design combination of a turbojet engine with a gasdynamical converter to increase the lift power of the surface effect ship.

Although the subject surface effect ship has been described by reference to a preferred embodiment, it is apparent that other modifications can be devised by those skilled in art that would fall within the scope and spirit of the present invention as defined by the appended claims.

What is claimed is:

1. A surface effect ship and a system of cushion pressurization by forcing into a cushion chamber a homogeneous mixture of air and gas therethrough, comprising a hull, having: a cabin, a pilot's compartment, propulsion means associated with rudders, a skirt attached to said hull thereby forming a cushion chamber beneath the ship, and a combination of a source of highly energetic gas with a gasdynamical converter, as a lift system, said converter comprising at its front end a subsonic narrowing nozzle, said source of gas and the gasdynamical converter being mounted coaxially aligned, allowing to enter into said gasdynamical converter said highly energetic gas simultaneously with inhaling of additional mass of said air, forming a homogeneous air and gas mixture with appropriate pressure and volume, said gasdynamical converter being in sealed connection with said cushion chamber into which a flow of required volume and pressure of said homogeneous air and gas mixture is directed to keep said surface effect ship hovering.

2. The surface effect ship as recited in claim 1 wherein said source of highly energetic gas is a turbojet engine.

3. The surface effect ship as recited in claim 1 wherein said gasdynamical converter further including a mixture chamber, located behind of said narrowing nozzle, to provide an intensive energy exchange between said highly energetic gas and said mass of air, forming a homogeneous mixture of air and gas.

4. The surface effect ship as recited in claim 1 wherein said gasdynamical converter further including a subsonic diffuser, located behind of said mixture chamber, to provide thermodynamical transformation of kinetic flow energy by decreasing the velocity to increase the flow pressure before entering of the homogeneous air and gas mixture into said cushion chamber of said surface effect ship to support said ship above a surface.

* * * * *